Feb. 9, 1965 P. J. BORCHERT 3,169,076
METHOD OF SIZING PAPER WITH DIALDEHYDE POLYSACCHARIDE-UREA
RESIN AND THE PRODUCT THEREOF
Filed May 11, 1960

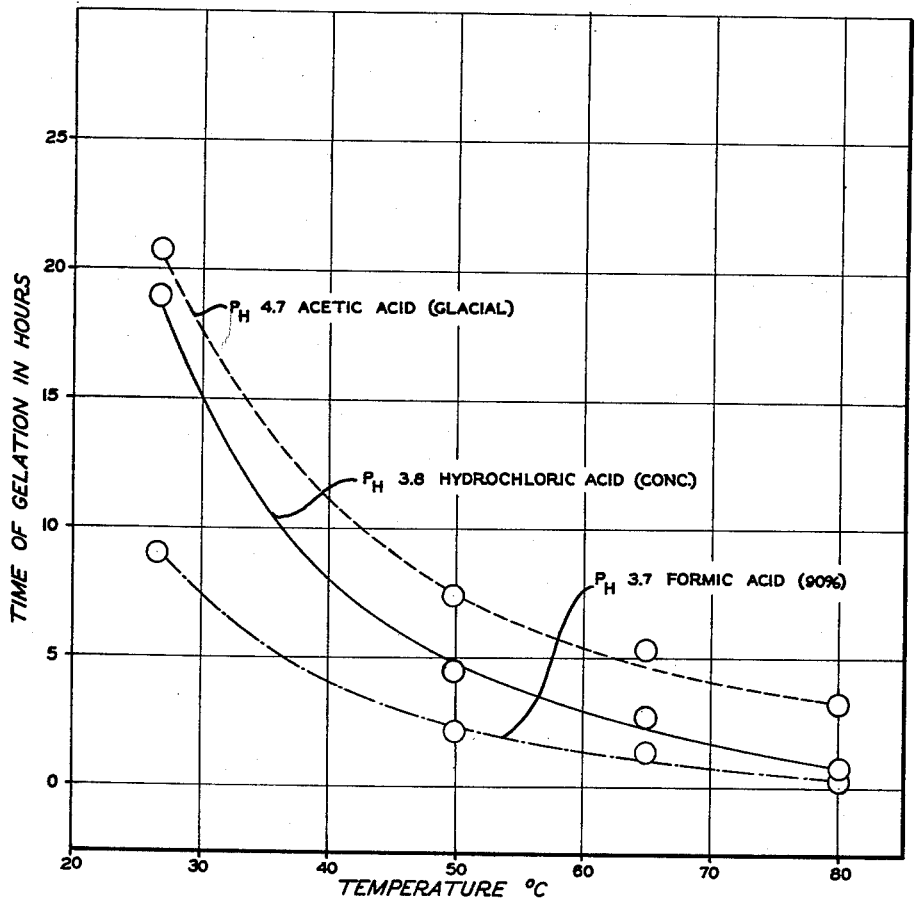

GELATION TIME OF DIALDEHYDE STARCH-
UREA DISPERSIONS BETWEEN 27°C & 80°C
CATALYZED WITH DIFFERENT ACIDS

DIALDEHYDE STARCH......90% OXIDIZED
MOLE RATIO..................1 MOLE UREA PER MOLE
DIALDEHYDE POLYMER UNIT
CONCENTRATION...........24% BY WEIGHT
AMOUNT CATALYST......10% BY WEIGHT ON SOLID
DIALDEHYDE STARCH-UREA

INVENTOR
BORCHERT
BY
*K. M. Le Fever*
ATTORNEY

United States Patent Office

3,169,076
Patented Feb. 9, 1965

---

3,169,076
METHOD OF SIZING PAPER WITH DIALDEHYDE POLYSACCHARIDE-UREA RESIN AND THE PRODUCT THEREOF
Peter J. Borchert, Elkhart, Ind., assignor to Miles Laboratories, Inc., Elkhart, Ind., a corporation of Indiana
Filed May 11, 1960, Ser. No. 28,447
5 Claims. (Cl. 117—62.2)

This invention relates to new and improved nitrogenous resins derived from dialdehyde polysaccharides and urea. In some of its more particular aspects, it relates to dispersions, gels, and films prepared from such resins.

Dialdehyde polysaccharides, of which dialdehyde starch is an example, may be prepared by the well known oxidation of polysaccharides with periodic acid. This preparation is illustrated by the conversion of starch to dialdehyde starch using periodic acid as the oxidizing agent in accordance with the following equation:

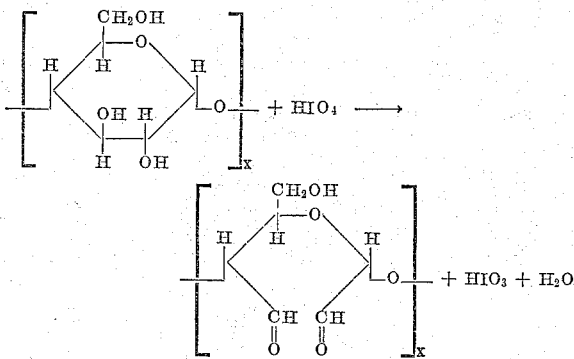

wherein $x$ stands for the number of repeating units in the molecule, which may range from about 20 to several thousand.

As disclosed in my copending applications, Serial No. 765,274, filed October 6, 1958, now U.S. Patent No. 3,001,979, and Serial No. 771,190, filed November 3, 1958, now abandoned, reaction products of dialdehyde polysaccharides with urea can be obtained in a slurry reaction. Either or both of the two carbonyl groups of the repeating polymer unit of the dialdehyde polysaccharide can be converted to groups consisting of

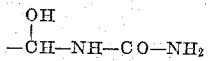

For example, the reaction of dialdehyde starch with urea can be shown by means of the following equations:

(1)

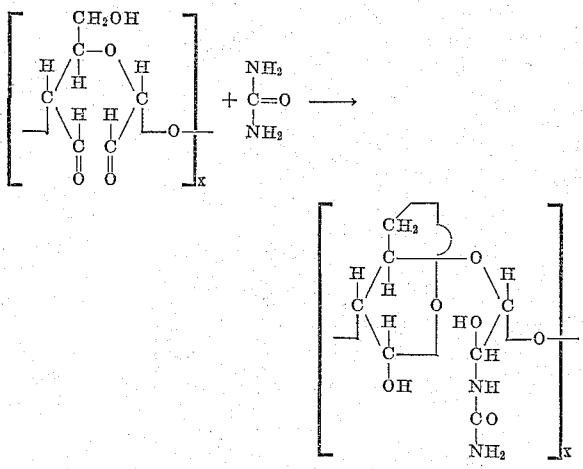

(2)

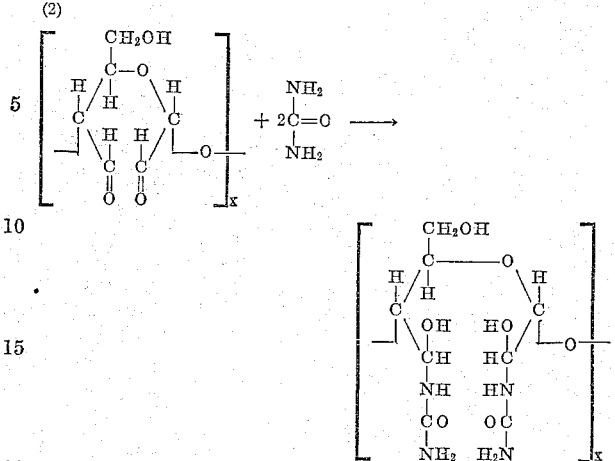

wherein $x$ has the same significance as above. The determination of which reaction will occur, 1 or 2, depends upon the reaction conditions. As shown in the equations, for example, whether one or two moles of urea per polymer unit of dialdehyde starch are used will in part determine whether the mono-urea product or diurea product will be obtained.

In my above mentioned copending applications, these dialdehyde polysaccharide-urea compounds are shown to find utility as molding powders in plastics and in various applications in the textile and adhesives industries. The dialdehyde polysaccharide-urea compounds, however, are recovered as amorphous powders which are water insoluble and, in the case of the diurea compounds, insoluble in dilute alkali as well. For many applications, such as in treating paper, it is desirable to have the polymeric treating agent in the form of an easily handled and readily absorbable dispersion such as an aqueous dispersion. The dialdehyde polysaccharide-urea compounds in the form of amorphous powders cannot be readily dispersed in suitable dispersing media and are therefore not adaptable to use in this form.

Urea-formaldehyde resins, on the other hand, are readily dispersable in a number of dispersing media. Because of this, urea-formaldehyde resins, particularly in the form of aqueous dispersions or solutions, are widely used in the paper, textile, adhesives and other industries. These resins, however, upon heating are degraded to a certain extent with volatilization of formaldehyde and other volatile compounds. The volatilization of formaldehyde even in small amounts creates hazardous working conditions because of the dangerous fumes which are evolved. In another respect, urea-formaldehyde resin dispersions have the disadvantage of low stability to changes in pH. It is well known, for example, that most solutions of urea-formaldehyde resins are stable only within a relatively narrow pH range, namely from about pH 7 to pH 8.5. Polycondensation, as the final stage of condensation of resins is sometimes called, is known to take place when the solution is subjected to proper conditions of acidity. In the case of resins used for imparting wet strength to papers and other fibers, for example, operation at a lower pH range than the range of stability of urea-formaldehyde resin solutions is desirable, since the curing time for wet strength resins is known to become shorter as the pH is lowered. In fact, a pH in the range of from about pH 4.0 to pH 4.5 is considered optimum for paper manufacture. Paper made from pulp treated with urea-formaldehyde resins and having a pH higher than about pH 6 shows very little wet strength even after aging.

It is accordingly a principal object of this invention to provide dispersions of nitrogenous resins which may be used in the paper, textile, and adhesives industries to greater advantage than the materials presently in use.

Another object of this invention is to provide a process for the preparation of such resins which is practical and convenient to use.

Another object of this invention is to provide dispersions of nitrogeneous resins derived from dialdehyde polysaccharides and urea which have desirable stability characteristics.

A further object of this invention is to provide dispersions of nitrogenous resins which are uniform and stable to changes in pH and are also stable in aqueous buffered solutions.

Still a further object of this invention is to prepare consistent gels.

Yet a further object of this invention is to provide gels which are water miscible under ordinary conditions.

Another object of this invention is to provide water insoluble films of nitrogeneous resins.

Another object of this invention is to provide a paper having improved wet strength and an easily operable process for preparing such paper.

Other objectives and advantages of this invention will appear in the course of the following detailed disclosure and description.

This invention in its broadest aspects concerns dispersions of nitrogenous resins comprising reaction products of dialdehyde polysaccharides and urea. These dispersions may be prepared by reacting a dialdehyde polysaccharide dispersion with urea or alternatively by reacting a solution of urea with a dialdehyde polysaccharide at a hydrogen ion concentration of from about pH 5 to pH 8.

The dispersions prepared in accordance with the process of this invention may be put to good advantage in a number of different ways. They may be used as dispersions directly, for example, to impart wet strength to paper or in other applications wherein a dispersion is desired for use. They may, if desired, be converted to gels for use in applications wherein a gel is needed. In addition, they may be converted into films of water insoluble resins which are useful in various coating applications.

For carrying out the process of this invention the dialdehyde polysaccharides used as starting materials for the process may be prepared as described above or by the electrolytic procedure disclosed in U.S. Patent No. 2,713,553 to Charles L. Mehltretter if desired. The dialdehyde polysaccharides to be used in this process may be the dialdehyde derivatives of any polysaccharide such as corn or potato starches, celluloses, dextrans, algins, inulin or others. Of these polysaccharides the dialdehyde derivatives of starch, known generically as dialdehyde starch, are the best known and most often used. However, where it is desired to have derivatives of other polysaccharides, these may also be used.

In general, it is preferred to use dialdehyde polysaccharides which are from about 50% to 100% oxidized, that is, those wherein 50 to 100 of the original anhydroglucose units have been converted to dialdehyde units, such as by periodate oxidation.

One of the procedures for preparing the nitrogenous resin dispersions of this invention which has been found convenient to carry out is that in which an aqueous dispersion of the dialdehyde polysaccharide is first prepared and urea is thereafter added to the dialdehyde polysaccharide dispersion. The dialdehyde polysaccharide dispersion may be prepared by adding the dialdehyde polysaccharide in whatever concentration is desired, for example, in the case of dialdehyde starch, in a concentration of from about 10% to 50% by weight to water or to a solution buffered at a hydrogen ion concentration in the range of from about pH 5 to pH 8, preferably at about pH 6 to pH 7, and at a temperature between about 30° C. and 70° C., preferably at about 50–60° C. More acidic solutions, that is, those having a pH of below about pH 5 are not suitable dispersing media in that little or no dispersion results. More alkaline solutions, that is, those having a pH of above about pH 8 have the marked disadvantage of degrading the dialdehyde polysaccharide. The addition of dialdehyde polysaccharide is accomplished gradually, such as by adding the dialdehyde polysaccharide in portions, in order to eliminate any sudden increase in viscosity which may be due to swelling of the granules of the dialdehyde polysaccharide prior to formation of the dispersion. Although the formation of the dialdehyde polysaccharide dispersion can be accomplished at a lower temperature, such as room temperature, it has been found preferable to utilize temperatures within the recommended range in order to accelerate the swelling of the granules and thereby facilitate the formation of the dispersion.

For optimum dispersion formation a buffered dispersing medium is used. The concentration of the buffer should be between about 0.1 N and 1.0 N and preferably from about 0.25 N to 0.50 N. Any buffer may be used which will give the desired buffering effect within the prescribed pH range of from about pH 5 to pH 8. These include disodium phosphate, sodium bicarbonate, and other buffers of a similar nature, as well as water soluble salts of organic acids and organic bases. For example, salts of carboxylic acids such as sodium acetate and salts of sulfonic acids such as sodium p-toluenesulfonate or amines such as triethanolamine might be used for this purpose. The concentration of the buffer solution and the temperature are inter-related in that the higher the concentration of buffer solution is, the lower the temperature required for forming the dialdehyde polysaccharide despersion will be.

If the dispersing medium for the dialdehyde polysaccharide is not buffered, that is, if it is desired to use water alone, dispersions of dialdehyde polysaccharides of markedly reduced concentration will be obtained even at higher temperatures and with considerably longer heating. The color of such dispersions indicates that there has been some degradation of the dispersed dialdehyde polysaccharide. In the case of non-buffered aqueous dispersions of dialdehyde starch, for example, dispersions having a concentration of only from about 10% to 12% dialdehyde starch are obtained at about 70° C. to 80° C. even with longer heating. The pH of these dispersions is in the range of from about pH 4.5 to pH 5.5.

The corresponding dialdehyde polysaccharide-urea dispersion may be readily formed from the dialdehyde polysaccharide dispersion prepared as described above. This reaction is conducted by adding urea to the dialdehyde polysaccharide dispersion. The reaction may be accelerated by heating if desired. The urea is found to dissolve readily in the dialdehyde polysaccharide dispersion with the formation of reaction products the nature of which is determined by the amount of urea which is added. Generally, from about 0.5 mole to 2.0 mole of urea per polymer unit of the dialdehyde polysaccharide is used in the reaction, and there is obtained a polymeric product wherein from about 0.5 mole to 1.0 mole of urea per carbonyl group of the dialdehyde polysaccharide polymer unit has reacted. The carbonyl groups of the repeating dialdehyde polysaccharide units are believed to have been converted to groups having either of the formulae A or B shown below:

(A) 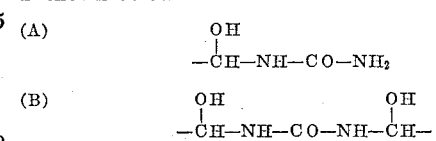

(B)

Equally effective to prepare the dispersions of the dialdehyde polysaccharide-urea resins of this invention is the method alternatively described above, namely the addition of the dialdehyde polysaccharide to a solution of urea and a buffer salt. This procedure may be conducted under the same conditions as described for the alternative procedure.

The resulting dispersions of the dialdehyde polysaccharide-urea resins are adaptable to a variety of uses. For example, the dispersion may be concentrated by evaporating part of the dispersing medium to give a more viscous product than the original dispersion yet which may have the same properties as to miscibility with various solvents as the dispersions initially prepared. In the case of aqueous dispersions of dialdehyde polysaccharide-urea resins, for example, the viscous, clear dispersions resulting from evaporation of part of the water under reduced pressure are found to be miscible with water in any desired proportion and also miscible with other solvents such as dimethylformamide, acetone and tetrahydrofuran. Another application for the dispersions of this invention lies in the preparation of gels. Further applications reside in the use of these dispersions to form solid resins and in a variation of this process to form plastic films which have desirable solvent resistant properties.

The concentrated dispersions which may be prepared by removal of part of the dispersing medium for the dialdehyde polysaccharide-urea resin may be prepared in concentrations as high as from about 50% to 90% solids content. The preparation of these highly concentrated resin dispersions can be readily accomplished by any conventional technique for concentrating liquids. Evaporation under reduced pressure is one such technique, but others such as evaporation with heating, or merely upon standing, may also be used if desired. The advantage of concentrating the dispersions lies in the fact that by so doing a greater quantity of effective dispersion can be stored or shipped in a given volume. The highly concentrated dispersions can be readily re-dispersed to give a dispersion of a lower concentration when it is desired to put the dispersion to use. This feature can result in economies in transportation and storage.

Another property of the dispersions of this invention which has proved particularly advantageous is the stability of the dispersions upon pH change. In particular, when the pH is changed to an acid pH, for example, to a pH level of lower than pH 6, instead of forming crystalline polymers from the dialdehyde polysaccharide-urea dispersions, formation of a consistent gel occurs within from a few minutes to several months depending on the concentration of the dispersion, the pH and the temperature. A remarkable characteristic of these gels which probably represent agglomerations of macromolecules is that these gels are still water miscible. The gels may be readily prepared by simply acidifying a dialdehyde polysaccharide-urea dispersion and either allowing the acidified dispersion to stand at room temperature, or heating until a consistent gel is formed. For example, by acidifying a 24% solids containing dialdehyde starch-urea aqueous dispersion with 10% by weight of acetic acid, based on solids content of the dispersion, to a final pH of pH 4.7 and either allowing the acidified dispersion to stand at 27° C. for 22 hours or heating to a temperature of 80° C. for a period of 10 minutes a gel is formed which at room temperature maintains its consistency at a stable level for an indefinite period of time. Gels obtained from relatively more highly concentrated dispersions, however, display some tendency to shrink with the release of water upon standing for prolonged periods of time. These gels form polymeric materials which do not appear to be capable of being redispersed like the gels formed from dispersions having lower solids concentrations. The gels prepared from the dialdehyde polysaccharide-urea dispersions of this invention may be used as binders for washable color paints, coatings for washable wall-paper, permanent textile fillers, binders for adhesives and binders in printing inks and pastes.

Another application for the resin dispersions of this invention is in the preparation of solid water insoluble resins by complete dehydration. Dehydration may be accomplished in a number of ways, such as by drying the dispersions at elevated temperatures or by using a solvent exchange method to replace the dispersing medium with a solvent wherein the resin may be separated from the dispersions. For example, in the case of aqueous resin dispersions, the solvent exchange method utilizing methanol and acetone has been found particularly effective to separate water insoluble resins from the dispersions. It is believed that the formation of these water insoluble resins may be due to a type of acetalization with cross-linkages between macromolecules also of some significance.

Where paper is treated with the resin dispersions of this invention in the manufacture of wet strength paper, for example, it is naturally to be expected that some acetalization will occur between the carbonyl groups of the dialdehyde polysaccharide and the hydroxyl groups of the cellulose in the paper. This is because even in the case of the resin dispersions in which two moles of urea are reacted per dialdehyde polysaccharide polymer unit there may be some carbonyl groups available for acetalization. Of course, this reaction may occur to a greater extent in the case of urea dispersions having 1:1 or 1:0.5 mole ratios of dialdehyde polysaccharide polymer units to urea for more carbonyl groups are available in these dispersions. The effect of acetal formation is in fact seen to be more pronounced in the case of these dispersions in the greater tensile strengths demonstrated by papers in which these resin dispersions have been incorporated.

In the field of paper chemistry, the formation of the desired water insoluble resins takes place either by solvent exchange or by dehydration under heating in the presence of an acidic catalyst. This formation is evidenced by the development of permanent dimensional stability as well as excellent wet and dry strength in the paper being treated. For example, when paper is dipped in the aqueous dispersions of dialdehyde starch-urea resins of this invention the final polycondensation reaction takes place under drying conditions using controlled elevated temperatures in the range of from about 80° C. to 120° C. in the presence of an acidic catalyst such as formic acid or other acids such as acetic, citric, lactic, phosphoric or the like.

As a particular example of how the resin dispersions of this invention can be used in paper treatment a 1–20% solids containing aqueous dispersion of a dialdehyde starch-urea resin can be used. The paper is tub-sized by simply dipping into the dispersion. The treated paper is then pre-dried at a temperature of from about 80° C. to 90° C. for a period of from about 5 to 30 minutes, acidified with a 5% aqueous solution of acetic acid by dipping or spraying and then dried again at a temperature of from about 80° C. to 120° C. for an additional period of from about 5 minutes to 30 minutes. One of the outstanding features of this invention as applied to paper treatment is that in lieu of this three-stage process, a simpler process is available for use with more dilute dispersions. Where the dialdehyde polysaccharide-urea dispersion has a solids content of from about 1% to 6%, for example, the use of the resin dispersion and the catalyst may be combined in one step, since such low concentration dispersions are stable for several days without gel formation. The acidified dispersion may then be applied to paper and dried as above. Paper treated according to both methods shows excellent wet strength, dry folding endurance, dry stiffness, and improved oil and grease resistance, as well as permanent dimensional stability.

The formation of plastic films is another facet of this invention. Film formation is accomplished by curing a suitably thin coating of the dialdehyde polysaccharide-urea resin dispersion in the presence of an acidic accelerator. For this purpose, suitable accelerators include oxalic acid, citric acid, lactic acid, phosphoric acid and other acidic accelerators. Curing is accomplished at elevated temperatures by heating a thin film of the resin dispersion, for example, by heating at a temperature in the range of from about 60° C. to 90° C. for a period of from about 30 to 60 minutes. The resulting dialdehyde starch-urea resin film is transparent and highly water resistant. These films are useful in the formulation of various coatings.

The invention will be better understood by reference to the following examples which are included for purposes of illustration and are not to be construed as in any way limiting the scope of this invention which is defined in the claims appended hereto.

EXAMPLE I

A dispersion of a dialdehyde starch-urea resin with a mole ratio of dialdehyde starch polymer unit to urea of 1 to 2 was prepared as follows:

Thirty-one grams of urea, 0.514 mole, were dissolved in 150 ml. of 0.25 N disodium hydrogen phosphate ($Na_2HPO_4 \cdot 12H_2O$) and the solution was warmed on a water bath at 30° C.

Five portions of 10 g. each, a total of 0.257 mole of dialdehyde starch (91% oxidation, 9.4% moisture) were added, with stirring at 30° C. over a period of 30 minutes. After the last part was added and dispersed, the dispersion was stirred for an additional 30 minutes. At the end of this time there was obtained a viscous dispersion of a dialdehyde starch-urea resin with a total solids content of 33%. The resin dispersion was found to be stable for a period of more than three months.

The dispersion described above was evaporated under reduced pressure at a bath temperature of 40° C. to 50° C. to a solids content of 55%. The resulting highly viscous, slightly yellow dispersion was found to be miscible with water and with dimethylformamide in any proportion.

The following example illustrates the use of the dialdehyde polysaccharide-urea resin dispersions of this invention in the preparation of water insoluble resins.

EXAMPLE II

Two hundred grams of dialdehyde starch-urea resin dispersion prepared as described in Example I, were poured with vigorous stirring into 150 ml. of methanol. A sticky white mass precipitated and was separated from the aqueous methanolic liquor and treated with 100 ml. of acetone. After standing for three hours, the sticky mass solidified. The product was isolated as 71 g. of a hard and brittle resin which could not be redissolved in boiling water.

The following example illustrates the result of the use of various acidic accelerators in preparing water resistant films from the dialdehyde polysaccharide-urea resin dispersions of this invention.

EXAMPLE III

With 9 g. of the resin dispersion prepared according to the procedure of Example I, there was mixed 1 ml. of a 5% aqueous solution of oxalic acid. The mixture was applied to a glass plate and cured at 80° C. for 30 minutes. The resulting transparent film was brittle and resistant to boiling water for a period of over 10 minutes.

The same results were obtained using 0.1 g. of 90% phosphoric acid, or 1 ml. of 5% citric acid in place of the oxalic acid accelerator.

It can be seen from this example that useful water resistant films can be readily prepared by curing dialdehyde polysaccharide-urea resin dispersions in the presence of an acidic accelerator.

The following example illustrates the preparation of dialdehyde polysaccharide-urea resin dispersions using another type of buffer salt.

EXAMPLE IV

One hundred grams of dialdehyde starch (97% oxidation, 10% moisture), 0.545 mole, were added with stirring in five portions of 20 g. each over a period of 30 minutes to 200 ml. of 1 N sodium acetate at 70° C. After the dialdehyde starch was completely dispersed, 65.5 g. of urea, 1.09 moles, was added and the clear dispersion was stirred at 50° C. for 30 minutes. The dispersion had a solids content of 47% and was found to be stable for a period of over 3 months at room temperature with no significant change in pH.

One hundred sixteen grams of the dispersion prepared as described above were evaporated under reduced pressure at a bath temperature of 70° C. to a solids content of 90%. The resulting dispersion was in the form of 61 g. of a yellow-brown resin of high viscosity. This dispersion was soluble in water, dimethyl formamide, acetone, methyl ethyl ketone, and tetrahydrofuran, and insoluble in alcohols, ether, esters (ethyl acetate, butyl acetate) and aromatic hydrocarbons (benzene, toluene, xylene).

The following example illustrates the aging of a dialdehyde polysaccharide-urea resin dispersion containing two moles of urea per dialdehyde polysaccharide polymer unit which results in the formation of a gel.

EXAMPLE V

A dispersion prepared according to the procedure of Example IV was converted into a consistent gel by acidifying and heating to 50° C. to 90° C. The results, using a number of acids at varying concentrations and pH's, are summarized in Table 1.

*Table 1*

| Exp. No. | Acid | Concentration (percent) | pH | Time for Gel Formation (minutes) | | |
|---|---|---|---|---|---|---|
| | | | | 50° C. | 70° C. | 90° C. |
| 1 | | | 6 | -- | -- | 30 |
| 2 | Acetic | 3 | 5 | -- | -- | 30 |
| 3 | do | 6 | 4.5 | -- | 10 | -- |
| 4 | Sulfuric | 3 | 3 | 10 | -- | -- |
| 5 | Oxalic | 2 | 5 | -- | -- | 30 |
| 6 | Citric | 2 | 5 | -- | -- | 30 |
| 7 | Lactic | 3 | 5 | -- | -- | 30 |
| 8 | Formic | 3 | 3.5 | 10 | -- | -- |

Gel formation was also accomplished by allowing the acidified resin dispersions to stand at room temperature for periods of from 12 hours to one week.

It can be seen from the above data that consistent gels are formed upon acidifying the dialdehyde polysaccharide-urea resin dispersions of this invention. If it is desired to form the gel within a relatively short period of time this can be accomplished by heating the acidified resin dispersion as shown in Table 1 above.

The following example illustrates the preparation of dialdehyde polysaccharide-urea resin dispersions containing 1 mole urea per mole of dialdehyde polysaccharide polymer unit.

EXAMPLE VI

One hundred grams of dialdehyde starch (90% oxidation, 9.5% moisture), 0.51 mole, were added with stirring in 5 portions of 20 g. each over a period of 30 minutes to 375 ml. of 0.5 N sodium acetate at 60–65° C. After the dialdehyde starch was completely dispersed 30.5 g. of urea, 0.51 mole, was added and the clear dispersion was stirred at 50° C. for 30 minutes. The dispersion had a solids content of 24% and was found to be stable for a period of over 3 months at room temperature with no significant change in pH.

The following example illustrates the aging of a dialdehyde polysaccharide-urea resin dispersion containing 1 mole of urea per dialdehyde polysaccharide polymer unit using various acids which results in the formation of gels.

EXAMPLE VII

Samples of 25 g. each of the freshly made dispersion prepared in accordance with the procedure of Example VI were mixed with 90% formic acid, concentrated hydrochloric acid or glacial acetic acid used in a concentration of 10% by weight of the solids content of the dispersion and the time of gelation of the samples determined at various temperatures. The data obtained are shown in Table 2 and plotted in the curves shown in the drawing.

*Table 2*

| Exp. No. | Acid | pH | Time for Gel Formation (hours) | | | |
|---|---|---|---|---|---|---|
| | | | 27° C. | 50° C. | 65° C. | 80° C. |
| 9 | Formic | 3.7 | 9 | 3 | 2 | 0.5 |
| 10 | Hydrochloric | 3.8 | 19 | 5 | 4 | 2 |
| 11 | Acetic | 4.7 | 21 | 8 | 7 | 5 |

The data in Table 2 above and these data plotted in the curves shown in the drawing demonstrate that the time of gelation decreases with increasing temperature and increases with increasing pH.

The following example illustrates the preparation of a dialdehyde polysaccharide-urea resin dispersion using a 50% oxidized dialdehyde polysaccharide in place of the over 90% oxidized polysaccharides of the previous examples.

EXAMPLE VIII

There were dissolved in 150 ml. of 0.5 N sodium acetate 34.6 g. of urea, 0.576 mole. The resulting solution was warmed on a water bath at 60° C. and 100 g. of dialdehyde starch (50% oxidation, 8% moisture), 0.288 mole, were added with stirring in 5 portions of 20 g. each at 60° C. over a period of 30 minutes. The yellow-brown dispersion resulting, which had a solids content of 46% and a pH of 7, was found to be stable for a period of over three months and was miscible with water in any desired level.

The following example illustrates the preparation of a dialdehyde polysaccharide-urea resin dispersion with a mole ratio of dialdehyde polysaccharide polymer unit to urea of 1:1 and its subsequent concentration.

EXAMPLE IX

The procedure of Example IV was used to prepare a dialdehyde starch-urea resin dispersion from 50 g. of dialdehyde starch (93% oxidation, 7.1% moisture) 0.27 mole, 16.1 g. of urea, 0.27 mole, and 200 ml. of a 0.1 N sodium bicarbonate solution. The bath temperature was 50° C. The resulting dispersion had a solids content of 23% and was found to be stable for a period of over three months at room temperature.

The dispersion prepared as described above was evaporated under reduced pressure at a bath temperature of 40° C. to 50° C. to a total solids content of 90%. The highly viscous and slightly yellow paste resulting was miscible with water in any proportion.

The following example illustrates the preparation of a dialdehyde polysaccharide-urea resin dispersion with a mole ratio of dialdehyde polysaccharide polymer unit to urea of 1:1.5.

EXAMPLE X

A dialdehyde starch-urea resin dispersion was prepared according to the procedure of Example IV, using 50 g. of dialdehyde starch (93% oxidation, 7.1% moisture), 0.27 mole, 24.3 g. urea, 0.405 mole, and 200 ml. of 0.3 N sodium acetate, except that the water bath was held at 50° C. instead of 70° C. The resulting dispersion had a solids content of 27% and a pH of 6. It was found to be stable for a period of over three months at room temperature. During this period the change in pH was insignificant.

The following example illustrates the use of dialdehyde starch-urea resin dispersions of various compositions and the use of various acid curing agents in effecting improvement in wet strength of paper.

EXAMPLE XI

Dialdehyde starch-urea resin dispersions having mole ratios of dialdehyde starch polymer units to urea of 1 to 0.5, 1 to 1, 1 to 1.5, and 1 to 2 were prepared according to the following procedure.

To solutions consisting of 10 g. of sodium acetate dissolved in 400 ml. of water and 16 g., 0.267 mole, 32 g., 0.535 mole, 48 g., 0.802 mole and 64 g., 1.07 mole of urea respectively, were added gradually 100 g. of dialdehyde starch (94% oxidation, 9.0% moisture), 0.535 mole, in portions with stirring until all the dialdehyde starch was dispersed The dispersions were stored in closed bottles at 27° C. for six days. At the end of this storage period they were diluted with tap water to concentrations of 3% and 6% solids content of the dialdehyde starch-urea resin. The diluted dispersions were then treated with formic acid or acetic acid by adding 5% by weight based on the solid resin content of formic acid or 10% of glacial acetic acid and the surface sizing properties of paper treated with each of these dispersions was determined in the following manner.

Strips of Whatman No. 1 paper were tub-sized by hand dipping in the dispersion at a bath temperature of 50–55° C. for exactly 10 seconds. The strips were pre-dried at 27° C. for approximately one hour. They were then oven-cured at temperatures of from 80° C. to 95° C. for 30 minutes to 1 hour.

After the strips had been stored at room temperature for six weeks, tensile strength measurements were taken in the following way.

The oven-cured papers were cut in strips 5½" long (machine direction) and ½" wide, and the dry tensile strength and wet tensile strength (after 5 minutes and 30 minutes' soaking time) were determined with a Thwing-Albert Tensile Tester, Model 3–7–4P. Values for the wet tensile strength were calculated as a percentage of the dry tensile strength. These data are shown in Table 3.

*Table 3*

| Exp. No. | Dialdehyde starch Polymer Unit/Urea (Mole Porportion) | Curing Acid | Sizing Bath, pH | Size Uptake, Percent | Dry Tensile, lb./inch | Wet[1] Strength, Percent Soaking Time | |
|---|---|---|---|---|---|---|---|
| | | | | | | 5 min. | 30 min. |
| 12 | | | | | 6.4 | (²) | (²) |
| 13 | 1:0.5 | Formic | 5–5.5 | 7.1 | 8.6 | 41.6 | 32.2 |
| 14 | 1:1 | do | 5–5.5 | 3.5 | 11.5 | 36.0 | 32.9 |
| 15 | 1:1.5 | Acetic | 4–5 | 9.3 | 9.1 | 17.3 | 15.6 |
| 16 | 1:2 | do do | 4–5 | 8.9 | 6.9 | 14.5 | 7.9 |

[1] $\frac{\text{Wet Tensile}}{\text{Dry Tensile}} \times 100 = $ Wet Strength.

² —Too low to measure.

These above data show that remarkable improvement in wet and even dry tensile strength is effected by the use of the dialdehyde polysaccharide-urea resin dispersions of this invention.

In addition to the above procedure it was found that if the paper strips were first tub-sized by hand dipping, then dried at 80° C. for 20–30 minutes then sprayed with a 5% aqueous solution of acetic acid and cured again at 80° C. for another 30 minutes, the wet strength of papers which were acid cured by this procedure was markedly greater than non-acid cured papers.

In summary, dispersions of dialdehyde polysaccharide-urea resins which are versatile in application are prepared by either reacting a dispersion of a dialdehyde polysaccharide with urea or by reacting a solution of urea with a dialdehyde polysaccharide. For best results, the liquid phase is buffered at a hydrogen ion concentration in the range of from about pH 5 to pH 8. The resulting resin dispersions, which are stable under ordinary conditions and even upon relatively drastic changes in pH, may be used as such, concentrated to form more viscous dispersions, acidified to form gels, dehydrated to give solid resins, or used in film formation. One of the outstanding uses of the dialdehyde polysaccharide-urea resin dispersions lies in their ability to impart greatly improved characteristics such as improved dry and wet strength and dimensional stability to paper.

What is claimed is:

1. A process for imparting enhanced wet strength characteristics to paper which comprises treating paper with about a 1% to 20% solids containing dispersion of a periodate oxidized polysaccharide-urea resin prepared according to the process comprising mixing a periodate oxidized polysaccharide and urea in an aqueous dispersion medium therefor at a hydrogen ion concentration in the range of from about pH 5 to pH 8 and at a temperature of from about 30° C. to 70° C. until complete dispersion of the reaction product thereof, drying said treated paper at a temperature between about 80° C. and 90° C. for a period of from about 5 to 30 minutes, acidifying with an aqueous solution of an acidic accelerator and drying at a temperature in the range of from about 80° C. to 120° C. for a period of from about 5 minutes to 30 minutes.

2. A paper which has been treated according to the process of claim 1.

3. A process according to claim 1 wherein the periodate oxidized polysaccharide is periodate oxidized starch.

4. A process for imparting enhanced wet strength characteristics to paper which comprises treating paper with about a 1% to 6% solids containing dispersion of a periodate oxidized polysaccharide-urea resin prepared according to the process comprising mixing a periodate oxidized polysaccharide and urea in an aqueous dispersion medium therefor at a hydrogen ion concentration in the range of from about pH 5 to pH 8 and at a temperature of from about 30° C. to 70° C. until complete dispersion of the reaction product thereof, said periodate oxidized polysaccharide-urea resin dispersion having been acidified to a hydrogen ion concentration in the range of from about pH 4 to pH 6 and drying said treated paper at a temperature in the range of from about 80° C. to 120° C. for a period of from about 5 to 30 minutes.

5. A paper which has been treated according to the process of claim 4.

References Cited in the file of this patent

UNITED STATES PATENTS

| | | |
|---|---|---|
| 2,514,689 | Woodward | July 11, 1950 |
| 2,624,686 | Kamlet | Jan. 6, 1953 |
| 2,648,641 | Robison | Aug. 11, 1953 |
| 2,838,465 | Porowski | June 10, 1958 |

OTHER REFERENCES

Sloan et al.: Ind. and Chem. Eng., vol. 48, pp. 1165–1172, July 1956.

Ellis: "Chemistry of Synthetic Resins," vol. 1, published by Reinhold Publishing Co., 1935, pp. 616, 639–644 and 675.

UNITED STATES PATENT OFFICE
CERTIFICATE OF CORRECTION

Patent No. 3,169,076                                February 9, 1965

Peter J. Borchert

It is hereby certified that error appears in the above numbered patent requiring correction and that the said Letters Patent should read as corrected below.

Column 3, lines 7, 11 and 19, for "nitrogeneous", each occurrence, read -- nitrogenous --; column 4, line 33, for "despersion" read -- dispersion --; column 6, line 23, after "urea" insert a comma; column 7, line 22, after "stirring" insert a comma; columns 9 and 10, Table 3, third column, under the heading "Curing Acid" strike out the last "do"; same Table 3, sixth column, under the heading "Dry Tensil, lb./inch", line 3 thereof, for "11.5" read -- 11.1 --; column 10, line 32, after "dispersed" insert a period.

Signed and sealed this 13th day of July 1965.

(SEAL)
Attest:

ERNEST W. SWIDER                                     EDWARD J. BRENNER
Attesting Officer                                         Commissioner of Patents